United States Patent [19]

Gaven, Jr. et al.

[11] 4,390,291

[45] Jun. 28, 1983

[54] THERMAL INDICATOR FOR WELLS

[75] Inventors: Joseph V. Gaven, Jr., Oakton, Va.; Chan S. Bak, Newbury Park, Calif.

[73] Assignee: Spectro-Systems, Incorporated, Oakton, Va.

[21] Appl. No.: 215,085

[22] Filed: Dec. 10, 1980

[51] Int. Cl.³ .............. G01K 1/14; G01K 11/06; G01K 13/02

[52] U.S. Cl. .................. 374/160; 73/151; 116/217; 374/104; 374/141

[58] Field of Search .......... 73/356, 358, 154, 151; 116/207, 217; 304/104; 374/160, 141

[56] References Cited

U.S. PATENT DOCUMENTS

| | | | |
|---|---|---|---|
| 1,535,536 | 4/1925 | MacDonald | 73/356 |
| 2,359,794 | 10/1944 | Rogers | 73/358 |
| 2,408,189 | 9/1946 | Baker | 229/5.6 X |
| 2,850,393 | 9/1958 | Romito | 73/358 X |
| 2,928,791 | 3/1960 | Loconti | 252/408 |
| 2,932,971 | 4/1960 | Moore et al. | 374/162 |
| 3,002,385 | 10/1961 | Wahl et al. | 116/207 X |
| 3,208,282 | 9/1965 | Bailly | 374/100 X |
| 3,260,111 | 7/1966 | Godbey | 73/356 |
| 3,260,112 | 7/1966 | Godbey et al. | 73/356 |
| 3,527,098 | 2/1969 | Salgado et al. | 374/160 |
| 3,661,142 | 5/1972 | Flam | 73/356 |
| 3,786,777 | 1/1974 | Smith et al. | 116/207 X |
| 3,802,269 | 4/1974 | Cooper | 374/162 |
| 3,878,722 | 4/1975 | Crites | 73/356 |

*Primary Examiner*—Daniel M. Yasich
*Attorney, Agent, or Firm*—Brady, O'Boyle & Gates

[57] ABSTRACT

Minute durable plate-like thermal indicators are employed for precision measuring static and dynamic temperatures of well drilling fluids. The indicators are small enough and sufficiently durable to be circulated in the well with drilling fluids during the drilling operation. The indicators include a heat resistant indicating layer, a coacting meltable solid component and a retainer body which serves to unitize each indicator and which may carry permanent indicator identifying indicia. The indicators are recovered from the drilling fluid at ground level by known techniques.

11 Claims, 8 Drawing Figures

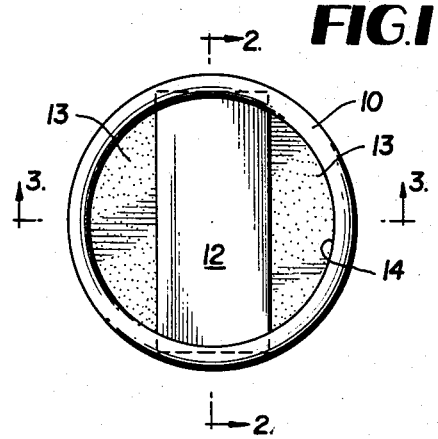
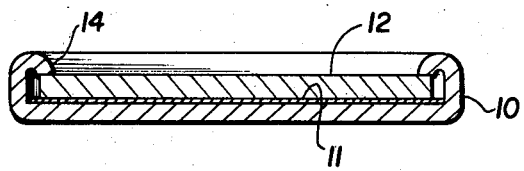
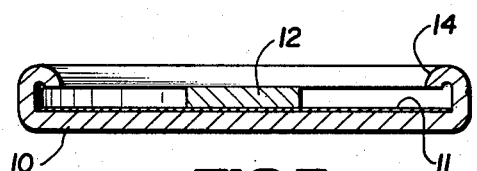
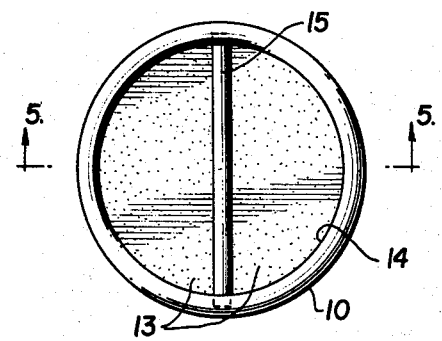
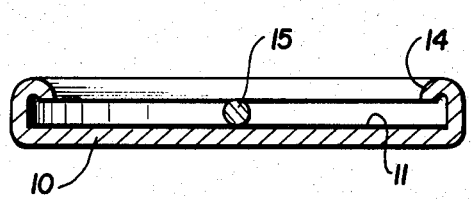
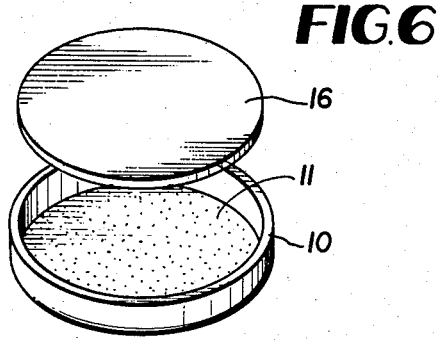
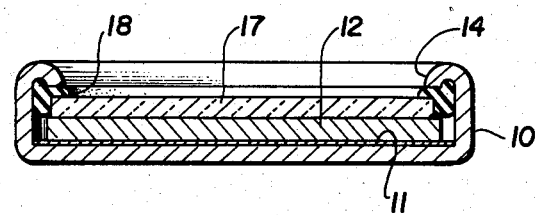
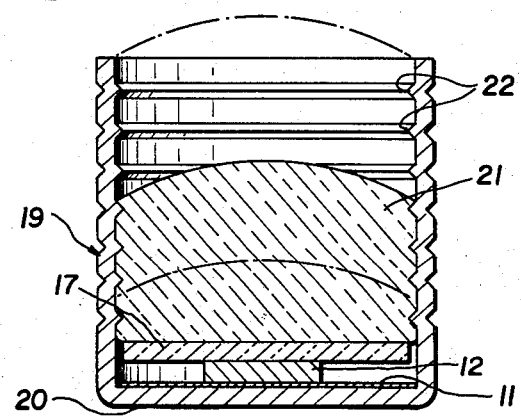

THERMAL INDICATOR FOR WELLS

The Government has rights in this invention pursuant to Contract No. EG-77-C-01-4008 awarded by the U.S. Department of Energy.

BACKGROUND OF THE INVENTION

The invention seeks to fulfill a need for a more precise and practical thermal indicator for indicating temperatures encountered in deep wells, such as oil wells and geothermal wells.

More particularly, it is an object of the invention to provide a thermal indicator for this purpose which can precisely indicate both static and dynamic temperatures of drilling fluids while withstanding the rigors of the drilling operation and without necessitating interruption of the latter.

A further important object of the invention is to provide a minute thermal indicator which will not clog the small drilling fluid passages of deep well drill bits while circulating with the drilling fluid.

Another object is to provide an indicator which is comprised of materials which will precisely indicate temperatures encountered in a well over the full range of temperatures which are normally experienced.

Another object is to provide a thermal indicator whose buoyancy in drilling fluids can be adjusted to compensate for changes in the consistency of such fluids during drilling operations.

Another important object of the invention is to provide an indicator of the above-mentioned type which is adapted to carry a permanent indicator marking which will survive passage of the indicator with the drilling fluid through the well during drilling operations.

Still another important object is to provide a thermal indicator for wells which employs a meltable solid indicator component, usually a metal alloy in coacting relationship with a heat resistant indicator substance, such as a heat resisting paint.

Another object of the invention is to provide a thermal indicator of the type mentioned immediately above, in which a variety of meltable alloys can be employed to form the meltable component, so that the latter will experience a clear and definite phase change in an extremely narrow and well defined temperature range.

Another object of the invention is to provide a precision thermal indicator for wells which is comparatively easy to manufacture at reasonable cost.

PRIOR ART

Known thermal indicators are not rugged enough to withstand circulation through a deep well with drilling fluid while the drill bit is in operation. Furthermore, known indicators are too complex in construction and are much less convenient to use than the present indicator. The prior art types are also less precise and are not as well suited to indicating with precision multiple well temperatures over a wide range and with a particular indicated temperature being in a very narrow or sharp range reflective of the narrow melting range of the chosen meltable component.

One prior art thermal indicator is shown in U.S. Pat. No. 3,260,112 to Godbey et al. This minute indicator is in the form of a small cartridge which contains an indicator scroll formed of foil having multiple temperature indicating chemical substances thereon. This indicator is not convenient to use, as it must be opened up to provide access to the scroll and the minute scroll must be uncoiled for proper inspection. The delicate construction of the capsule-type Godbey et al. indicator renders it much more likely to be crushed and destroyed in the well than the indicator according to this invention which is in the form of a minute solid tablet or plate. Furthermore, the indicator in accordance with the invention is more precise then the prior art and more suited to the particular environment found in a deep well due to a careful and wide selection of candidate materials for the critical melting component. The indicator according to the invention employs only a single melting component which is carefully chosen for melting in a very sharp temperature range so as to result in precision indication of static or dynamic temperatures.

BRIEF DESCRIPTION OF DRAWING FIGURES

FIG. 1 is a plan view of a thermal indicator according to the invention.

FIG. 2 is a vertical section taken through the indicator taken on line 2—2 of FIG. 1.

FIG. 3 is a similar section taken on line 3—3 of FIG. 1.

FIG. 4 is a plan view of an indicator according to a modified form of the invention.

FIG. 5 is a vertical section taken on line 5—5 of FIG. 4.

FIG. 6 is an exploded perspective view showing an indicator in accordance with a second modification.

FIG. 7 is a cross sectional view similar to FIG. 2 showing a thermal indicator in accordance with another modification of the invention.

FIG. 8 is a similar view showing an indicator having a buoyancy feature in accordance with still another modification of the invention.

DETAILED DESCRIPTION

Referring to the drawings in detail wherein like numerals designate like parts and referring initially to FIGS. 1 through 3, a thermal indicator is shown having a shallow retainer body 10 or pan which may be formed of sheet aluminum, brass, or in some cases magnetically attractable sheet material. While the retainer body 10 is illustrated as circular, it may have other shapes in practice and the invention is not limited to any particular shape for the indicator. The interior face of the retainer body receives a coating 11 or layer of heat resistant durable visual indicating material, such as bright red engine enamel or a similar substance. A bar 12, rod or ribbon of a meltable indicator substance, preferably a metal alloy which melts at a precisely defined narrow temperature range such as a small fraction of a degree centigrade, spans the interior of the retainer body 10 centrally thereof in the solid state, providing exposed areas 13 of the indicating medium 11 on opposite sides of the bar 12. Opposite ends of the bar 12 are anchored in permanently assembled relationship with the retainer body or pan 10 by a rolled or crimped marginal edge flange 14 of the retainer body. This crimping may be in the form of a continuous bead as illustrated or may, in some cases, be an interrupted bead or flange.

The resulting thermal indicator structure is unitary and very rugged and durable, so as to be capable of withstanding the rigors of passing with drilling fluid through the drill pipe string in a well, through the small fluid passage of a working drill bit at the bottom of a well, and then back up to ground level through the annulus which exists between the drill pipe string and well casing. Recovery of the indicators at ground level can be with magnetic means, in some instances, screening, shaking or the like along with proper washing.

As stated, the assembled indicator is a minute plate-like structure whose maximum thickness does not exceed about 1/16 inch or less, and whose maximum diameter or width is ¼ inch or less. These dimensions enable the indicators to pass safely through the fluid ports of a well drilling bit without clogging the latter. The unitized nature of the indicator and its inherent rigidity resist destruction in the well and allow the indicators to circulate through the well while the process of drilling is taking place.

As shown in FIGS. 4 and 5, modification of the invention is shown wherein the meltable component 15, of the indicator, is in the form of a wire of carefully chosen metal alloy. The use of such a wire renders the manufacturing of the indicator somewhat simpler and costs less. The ends of the wire element 15 are secured by the same bead or crimp 14 described in the prior embodiment, and except for the wire element 15 the indicator structures in FIGS. 1–3 and FIGS. 4 and 5 are identical. In the case of either form of thermal indicator in a well or the like, to indicate a static or dynamic temperature of drilling fluid, the meltable indicator component 12 or 15 will melt away substantially completely and disappear whenever a temperature in the well is encountered to cause the melting of the element 12 or 15 which is carefully selected to melt at a precise and very narrow temperature gradient.

Annexed to this specification is a table of candidate alloys which have been carefully selected by experimentation to melt at a number of narrowly defined melting ranges over a complete spectrum of temperatures normally encountered in a well bore hole, such spectrum being 80° C. to about 350° C.

This table includes a column of alphanumeric alloy identifying markings which can be embossed or stamped in the bottom wall of the body or pan 10 and will remain viewable after the indicator passes through the well and is recovered for inspection.

FIG. 6 shows a further modification of the invention wherein the retainer body 10, after having the heat resistant enamel 11 applied to it, receives in covering relationship to the surface of layer 11 a complete disc 16 of the meltable alloy to be employed for the particular temperature at which the thermal indicator is designed to respond. This meltable disc is locked in assembled relationship with the retainer body 10 by the aforementioned marginal crimp flange 14. Prior to use, the disc 16 completely seals the indicating surface 11. When subjected to the critical melting temperature during use, the disc 16 completely disappears and leaves the indicating surface 11 exposed to view, indicative of the fact that the critical temperature has been reached or exceeded.

FIG. 7 depicts a further modification of the invention wherein the retainer body 10, indicator coating or layer 11 and meltable alloy bar 12, all previously described, are employed. Additionally, a transparent disc 17 formed of mica or mylar, each having good resistance to deterioration from heat, is employed as a pressure transmitter in the thermal indicator. This disc rests on the bar 12 and is held in fixed relation to the bar and the body 10, by the aforementioned flange 14. Preferably, a seal 18 of silicone is employed under the flange around the margin of the transparent disc. The disc 17 may be formed of other heat resistant transparent materials, that are thermally conductive.

In a deep well, fluid pressure acts on the disc 17 and when the bar 12 melts at the prescribed temperature, the disc transmits pressure to the melted bar and spreads the melted alloy evenly over the indicating surface 11 to conceal or nearly conceal it from view so that an observer will know at a glance that the indicator has responded to the prescribed temperature in a well or the like.

In FIG. 8, a modification of the invention is shown which includes a retainer body 19 which is deeper than the retainer body 10 and may measure as much as ¼ inch from its flat bottom wall 20. The described indicating layer 11 of red engine enamel or the like, the meltable alloy bar 12 and the mica or mylar transparent disc 17 are utilized. Above the pressure transmitter disc 17 to regulate the buoyancy of the indicator, a silicone seal 21 of necessary thickness and volume is introduced into the cup-like retainer body 19. The phantom lines in FIG. 8 show that the thickness of the buoyant seal 21 may vary depending on how much buoyancy it is desired to impart to the thermal indicator. The degree of buoyancy will, in turn, depend on the density and other consistency of the drilling fluid. The make up of this fluid is varied during well drilling depending upon what types of formations are being drilled and other factors. By changing the thickness of the seal 21, the buoyancy of the indicator can be regulated over a wide range. The seal 21 is substantially transparent like the mica or mylar disc 17. The latter functions to transmit pressure to the meltable element 12 to spread out the melted material in the manner described for FIG. 7. Other heat resistant transparent materials may also be used for the seal 21.

The side wall of the retainer body 19 can be indented or roughened as at 22 for retaining the seal 21, disc 17 and bar 12. Optionally, the top of the side wall can be crimped over to produce a bead or flange similar to that described at 14 in the prior embodiments.

The previously-mentioned table of candidate alloys for the meltable component of the thermal indicator is shown below. This table in the first column shows the alphanumeric indicia stamped in the retainer 10 or 19. In the second column, the candidate alloys are identified, with their melting points and melting ranges specified in the third column of the table. A fourth and final column of the table indicates the effect of pressure on the melting point of each candidate alloy.

An inspection of the table of candidate alloys shows a total of 42 metals or alloys of metals. The table shows that at temperatures below 170° C. the entire range of temperatures down to 76° C. is well covered with temperature intervals of roughly 10° C. For temperatures above 170° C., there are three temperature gaps; one gap between 329° C. and 344° C. (a 15° interval); another gap between 184° C. and 198° C. (a 14° gap); and a third gap between 205° C. and 218° C. (a 13° interval).

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

TABLE OF CANDIDATE ALLOYS

| Temp. marks | Compound Name or Alloy Composition (wt. %) | Melting point (°C.) | Melting range (°C.) | Melting point change (°C./1000 psi) |
|---|---|---|---|---|
| A | Bi 48.5, In 41.5, Cd 10 | 76 | <0.1 | 0.028 |
| D | In 52.34, Bi 47.66 | 88 | <0.1 | 0.023 |
| F | Bi 52.5, Pb 32, Sn 15.5 | 96 | 0.3 | −0.031 |
| H | Bi 54, Sn 26, Cd 20 | 103 | 0.3 | 0.024 |
| J | Bi 67, In 33 | 110 | <0.1 | −0.079 |
| L | In 52, Sn 48 | 118 | <0.1 | 0.52 |
| M | Bi 56.5, Pb 43.5 | 126 | 0.4 | −0.12 |
| O | Bi 56, Sn 40, Zn 4 | 133 | 0.5 | 0.054 |
| P | Bi 60, Sn 40 | 139 | 0.4 | −0.025 |
| S | Bi 60, Cd 40 | 147 | 0.5 | −0.0067 |
| U | Sn 68.35, Od 29.25, Zn 2.4 | 159 | <0.1 | 0.77 |
| X | Sn 71, Pb 24, Zn 5 | 170 | 0.3 | 0.39 |
| Z | Sn 67.75, Cd 32.25 | 175 | <0.1 | 0.084 |
| 2 | Sn 62.5, Pb 36.15, Ag 1.35 | 180 | 0.2 | 0.26 |
| 3 | Sn 61.9, Pb 38.1 | 184 | 0.6 | 0.32 |
| 5 | Sn 91, Zn 9 | 198 | <0.1 | 0.22 |
| 6 | Sn 91, Mg 9 | 205 | 0.8 | 0.42 |
| B. | Sn 95.8, Ag 3,5, Cu 0.7 | 218 | 0.7 | 0.26 |
| D. | Sn 96.5, Ag 3.5 | 222 | 0.1 | 0.26 |
| E. | Sn 99.5, Al 0.5 | 229 | 0.7 | 0.24 |
| F. | Sn | 231 | 0.3 | 0.29 |
| H. | Sn 99.41, Cu 0.32, Al 0.27 | 234 | 0.1 | 0.26 |
| I. | Pb 79.7, Cd 17.7, Sb 2.6 | 239 | 0.4 | 0.34 |
| J. | Pb 84, Sb 12, Sn 4 | 243 | 0.6 | 0.31 |
| K. | Pb 82.6, Cd 17.4 | 249 | 0.1 | 0.20 |
| L. | Pb 88.9, Sb 11.1 | 253 | <0.1 | 0.21 |
| M. | Bi 97.3, Zn 2.7 | 256 | 0.7 | −0.21 |
| N. | Bi 97.5, Ag 2.5 | 263 | 0.6 | −0.22 |
| O. | Cd 82.6, Zn 17.4 | 265 | 0.2 | 0.34 |
| P. | Bi | 273 | 0.2 | −0.26 |
| R. | Pb 91, Sb 4.68, Cd 4.32 | 276 | <0.1 | 0.36 |
| S. | Ga 92, Mg 18 | 285 | 1.5 | 0.053 |
| T. | Cd 92.45, Sb 7.55 | 294 | 0.6 | 0.50 |
| U. | Pb 96.97, Ag 2.20, Sb 0.83 | 301 | <0.1 | 0.68 |
| X. | Pb 97.5, Ag 2.5 | 303 | 0.4 | 0.48 |
| Y. | Pb 97.55, Ag 1.75, Sn 0.7 | 311 | <0.1 | 0.49 |
| Z. | Pb 98.1, Sb 1, Zn 0.9 | 315 | 0.5 | 0.59 |
| 2. | Pb 97.4, Sn 2.6 | 320 | 0.5 | 0.61 |
| 3. | Pb 98.76, Sn 1.24 | 325 | 0.5 | 0.49 |
| 5. | Pb | 329 | 0.5 | 0.58 |
| 6. | Zn 92.97, Al 4.08, Mg 2.95 | 344 | 0.3 | 0.30 |
| 7. | Te 70.6, Ag 29.4 | 351 | 1.4 | 0.47 |

We claim:

1. A thermal indicator for circulation with fluid in a well and sized to pass through the fluid ports of a well drilling bit for indicating if a chosen temperature range has been encountered in the well, comprising a shallow pan-like retainer body of durable sheet material having a bottom surface portion adapted to bear a substantially permanent identifying marking and having an open top, a meltable solid metal alloy indicator component having a narrowly defined single melting temperature range chosen from the temperature spectrum 76° C. to 351° C. normally encountered in a well, said indicator component at least partially covering the bottom portion prior to melting of said component and being exposed for contact with the fluid circulated in the well, a flange-like formation on said retainer body adjacent the open top thereof, said meltable solid metal alloy indicator component extending across the bottom surface portion and beneath said flange-like formation at opposite sides of said retainer body, and said flange-like formation mechanically fixedly securing opposite sides of said component to said retainer body prior to the melting of said component, whereby when the narrowly defined melting temperature range of said indicator component is encountered in the well said component melts from beneath said flange-like formation and separates from said retainer body exposing said bottom portion and is lost in the fluid in the well.

2. A thermal indicator as defined in claim 1, and said meltable solid metal alloy indicator component comprising a bar-like component disposed substantially centrally on and across said bottom surface portion.

3. A thermal indicator as defined in claim 1, and said meltable solid indicator component comprising a solid layer completely covering said heat resistant indicator surface prior to melting.

4. A thermal indicator comprising a shallow pan-like retainer body of durable sheet material having a bottom surface portion adapted to bear a substantially permanent identifying marking and having an open top, a meltable solid metal alloy indicator component having a narrowly defined melting range at least partially covering the bottom portion prior to melting of said component, a flange-like formation on said retainer body extending around the open top thereof, said meltable solid metal alloy indicator component extending across the bottom surface portion and beneath said flange-like formation at opposite sides of said retainer body, a substantially transparent pressure transmitting element spanning said retainer body and having a marginal edge portion extending beneath said flange-like formation and on top of said indicator component, said substantially transparent pressure transmitter element bearing on said indicator component to spread said indicator component when melted over said bottom surface portion in pressure conditions, and said flange-like formation mechanically fixedly securing opposite sides of said component to said retainer body prior to the melting of said component.

5. A thermal indicator as defined in claim 4, wherein said retainer body is formed of sheet metal.

6. A thermal indicator as defined in claim 4, including a heat resistant indicator surface means comprising a layer of heat resistant material on said bottom surface portion of the retainer body.

7. A thermal indicator as defined in claim 6, and said layer comprising heat resistant paint.

8. A thermal indicator as defined in claim 6, and said meltable solid metal alloy indicator component comprising a bar-like component disposed substantially centrally on and across said heat resistant indicator surface.

9. A thermal indicator as defined in claim 4, and a sealant between the flange-like formation and the marginal edge portion of the pressure transmitter element.

10. A thermal indicator as defined in claim 9, and said transmitter element comprising a mica plate-like element.

11. A thermal indicator as defined in claim 9, and said transmitter element comprising a transparent plastics material element.

* * * * *